United States Patent
Desai et al.

(10) Patent No.: US 7,600,230 B2
(45) Date of Patent: Oct. 6, 2009

(54) SYSTEM AND METHOD FOR MANAGING SECURITY META-DATA IN A REVERSE PROXY

(75) Inventors: Ajay Desai, Redwood City, CA (US); Ming Lei, Fremont, CA (US); Fredric Goell, Foster City, CA (US); Lawrence Jacobs, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 931 days.

(21) Appl. No.: 10/885,338

(22) Filed: Jul. 6, 2004

(65) Prior Publication Data

US 2006/0010442 A1  Jan. 12, 2006

(51) Int. Cl.
*G06F 3/00* (2006.01)
*G06F 15/16* (2006.01)
*G06F 7/04* (2006.01)

(52) U.S. Cl. .................. 719/311; 709/228; 726/27
(58) Field of Classification Search ............... 707/9; 709/201–207, 217–219, 227, 228; 711/111–113; 713/155–161, 168–172, 183–185; 715/741, 715/742; 719/311, 330–332; 726/2–21, 726/27
See application file for complete search history.

(56) References Cited

U.S. PATENT DOCUMENTS

| | | | | |
|---|---|---|---|---|
| 5,991,810 A | * | 11/1999 | Shapiro et al. | 709/229 |
| 6,085,227 A | * | 7/2000 | Edlund et al. | 709/203 |
| 6,256,739 B1 | * | 7/2001 | Skopp et al. | 726/2 |
| 7,114,180 B1 | * | 9/2006 | DeCaprio | 726/18 |
| 2002/0111942 A1 | * | 8/2002 | Campbell et al. | 707/3 |
| 2004/0019892 A1 | * | 1/2004 | Sandhya et al. | 718/107 |
| 2006/0026286 A1 | * | 2/2006 | Lei et al. | 709/227 |
| 2006/0031442 A1 | * | 2/2006 | Ashley et al. | 709/223 |

* cited by examiner

*Primary Examiner*—Li B Zhen
*Assistant Examiner*—Charles E Anya
(74) *Attorney, Agent, or Firm*—Park, Vaughan & Fleming LLP

(57) ABSTRACT

A system and method for managing security meta-data in a reverse proxy server. The reverse proxy caches data served by an origin server, and also stores security meta-data for authenticating a user and/or authorizing access to cached data. The security meta-data may include an ACL (Access Control List), access control token or descriptor, other access control information, user credentials, user privileges or roles, group membership, user aliases, etc. The reverse proxy may automatically receive access control information from the origin server when a request for data is forwarded to the origin server, or may explicitly request the information from the origin server or a security server. The reverse proxy receives and applies invalidation messages to invalidate stored security meta-data. Also, the reverse proxy acts in a stateful manner, with knowledge of the correlation between a given user and that user's session with the origin server.

23 Claims, 3 Drawing Sheets

SYSTEM AND METHOD FOR MANAGING SECURITY META-DATA IN A REVERSE PROXY

BACKGROUND

This invention relates generally to caching and managing cached data. More particularly, a system and method are provided for caching and managing, in a reverse proxy cache, security meta-data relating to cached data.

A reverse proxy server caches data from one or more back-end systems (e.g., web servers, application servers, databases), to serve to any number of clients or end users. In traditional reverse proxy cache systems or servers, the reverse proxy is oblivious to the existence of user sessions. Its concept of a "session" is limited to the receipt and resolution of a single user query. It maintains state information only for the duration of the user query and its response. As a result, if a single user submits multiple queries to the same cache, the cache has no way of knowing or detecting that all the queries are for the same user.

Because it is not "session-aware," a traditional reverse proxy cache is unable to enforce consistency across the spectrum of activity it may engage in for a particular user session. More specifically, it cannot perform session scope caching. Instead, each transaction it handles for a user is processed independently of any other transactions handled for the same user.

Further, because it is not session-aware, if a reverse proxy cache intercepts a series of transactions from one user, a back-end server that established a session with the user (e.g., for web browsing, for an application) may timeout because it believes the user has ceased operation. The cache is unable to inform the server that the user associated with a particular session is still active, as it has no awareness of the session.

As another consequence of its lack of session-awareness, a traditional reverse proxy cache is unable to cache or apply security measures to its cached data. For example, even if a back-end application server or web server enforces an authorization or authentication mechanism to protect data, when that data is cached in the reverse proxy, the cache is incapable of applying the same mechanism.

Traditional cache systems are not configured to internally store or apply security mechanisms for cached data (e.g., an access control list or ACL). They could not authenticate a user who has requested access, nor determine whether the user is authorized to access the requested data. As a result, a user could access virtually any cached data by an appropriately formatted data request to the cache, even if the user would be denied access if the request were handled at an origin server. Instead, caches generally rely upon external authorization of data access (e.g., by an origin server). This results in increased network traffic and additional processing at the origin server, and therefore detracts from any performance gain achieved by caching data in the cache system.

SUMMARY

In one embodiment of the invention, a system and method are provided for managing security meta-data in a reverse proxy server or cache. The reverse proxy caches data served by an origin server, and also stores security meta-data for authenticating a user and/or authorizing access to cached data. The security meta-data may include an ACL (Access Control List), access control token or descriptor, other access control information, user credentials, user privileges or roles, group membership, user aliases, etc. The reverse proxy may automatically receive access control information from the origin server when a request for data is forwarded to the origin server, or may explicitly request the information from the origin server or a security server. The reverse proxy receives and applies invalidation messages to invalidate stored security meta-data. Also, the reverse proxy acts in a stateful manner, with knowledge of the correlation between a given user and that user's session with the origin server.

The reverse proxy may also store other user session meta-data (e.g., user identifier, session identifier, session expiration). Such session meta-data may be explicitly provided by the origin server, or may be gleaned from communications exchanged between a user and the origin server. The reverse proxy may keep the origin server from terminating the user's session by notifying the origin server that the session is still active.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for managing user session meta-data in a reverse proxy cache. The reverse proxy serves as a front end for one or more origin servers (e.g., web servers, application servers, databases) that establish user sessions with end users or clients. In this embodiment, the cache tracks a specific user session by session meta-data (e.g., a session identifier, a user identifier, a cookie, an expiration date or time), and therefore is capable of providing "session-scope" or "user-scope" caching.

With session-scope caching, the reverse proxy cache can enforce coherence or consistency across a wide spectrum of activities within one user session. For example, the cache can apply authentication or authorization controls on all data requests of a particular user. And, by observing when a user session ends, the cache can determine when it is permissible to invalidate (e.g., garbage collect) data that was cached for that user.

In addition, when a reverse proxy cache can resolve a request to a particular session or user, the cache can customize its response appropriately. For example, specified portions of requested data may be tailored for different recipients, or information (e.g., hyperlinks, advertisements) accompanying a response may be tailored.

In another embodiment of the invention, a system and method are provided for managing security meta-data in a reverse proxy server. The security meta-data is used to authorize access to data cached in the reverse proxy server and/or to authenticate users requesting access to cached data. In this embodiment, cached meta-data may be invalidated in the reverse proxy server when no longer valid.

Managing User Session Meta-Data

Figure 1:
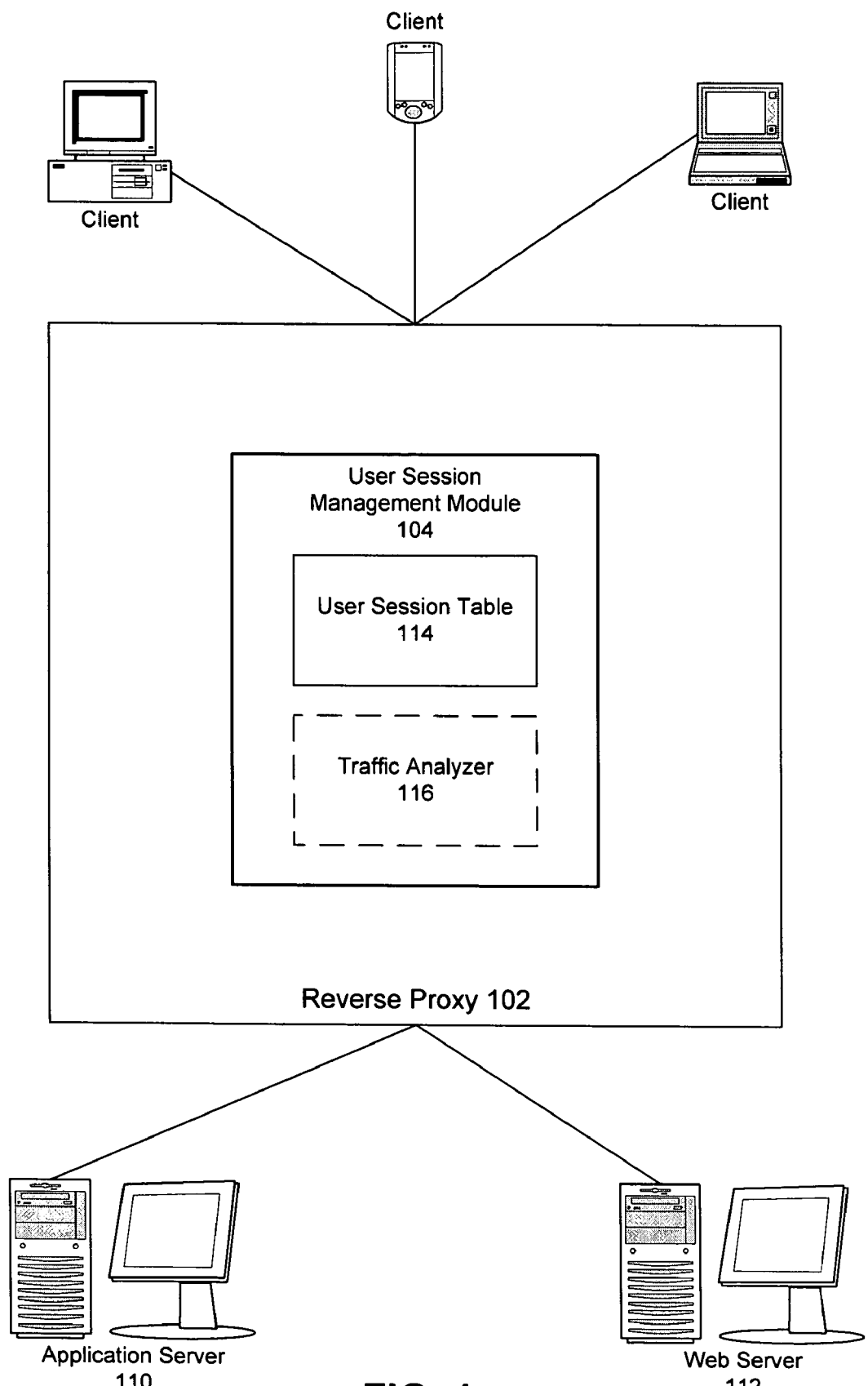
FIG. 1 depicts a reverse proxy server configured to manage user session meta-data, according to one embodiment of the present invention.

FIG. 1 depicts an environment in which a reverse proxy server manages user session meta-data, according to one embodiment of the invention.

In this embodiment, reverse proxy server 102 caches data from one or more origin servers (e.g., application server 110, web server 112) for access by any number of clients or end users. In particular, reverse proxy server 102 may be part of a front end that receives client network traffic directed to a back-end server.

Application server 110 and web server 112 may enforce standard session controls, such as a username and password for user authentication, an access control list (ACL) for authorizing access to a data object, etc. There are three primary activities regarding user sessions that are enforced by the back-end server: Establishment or creation of a user session when a user logs in; Tearing down of the user session when the user logs out or is disconnected (e.g., because the session expires, because the user attempts an impermissible operation); and the possible association of an Expiration date (or timeout feature) with the session.

In the embodiment of FIG. 1, user sessions are created and torn down by back-end servers, but reverse proxy server 102 observes the user session activity and tracks the user sessions through associated meta-data. In particular, user session management module 104 is configured to maintain user session table 114, which maps user identities (e.g., usernames, user IDs) to attributes of the users' sessions (e.g., cookies, session IDs). Illustratively, for each user session observed by user session management module 104, an entry in user session table 114 may be populated with a user ID, a session ID, a timeout or expiration value for the session, and/or virtually any other session-related information (e.g., access control information, user privileges or credentials, user aliases).

To maintain user session table 114, user session management module 104 is configured to detect the events identified above: Establishment and Tearing down of a session, and any associated Expiration. In the illustrated embodiment of the invention, traffic analyzer 116 or some other entity may be configured to detect these events.

Establishment of a user session: In one embodiment, traffic analyzer 116 identifies a user login request, by a requested URL or other parameter and/or a response to a successful login, because such communications are passed through reverse proxy server 102. In one particular embodiment of the invention, traffic analyzer 116 may detect when a specific request/response exchange between a client and a back-end server matches a specified pattern. For example, the login request may include one particular field (e.g., user ID, username) and the response may include a second particular field (e.g., session ID, set_cookie=). The traffic analyzer may then correlate the two fields.

Tear down of the user session: Traffic analyzer 116 may detect an explicit user logout if the logout request, or a response to the logout request, matches a specified pattern (e.g., targets a particular URL). Or, when a back-end server terminates a user session (e.g., for inactivity), the traffic analyzer may observe the use of a predetermined value for a significant field in a communication sent from the back-end server to a user (e.g., set_cookie=0) or vice versa. In one alternative embodiment of the invention, when a back-end server terminates a user session or logs a user out, it may explicitly notify the reverse proxy server.

Expiration date: An expiration date or time for a user session may be set by a back-end server or by reverse proxy server 102. For example, the back-end server may include an expiration value in its response to a successful login. The reverse proxy server notes the expiration and attempts to keep the user session from expiring when it shouldn't. For example, if an expiration date is assigned to a user session, subsequent data requests or other communications from the user may be intercepted by reverse proxy server 102 (i.e., and not be forwarded to the back-end server). In this case, the reverse proxy server may ensure that the back-end server is notified that the user session is still active and does not terminate the session at the expiration date. For example, the reverse proxy may let a data request or other communication go through to the back-end server that it would otherwise intercept. Or, the reverse proxy may send a "heartbeat" signal to the back-end server to inform the server that a specified user session is active and should not be torn down.

In one embodiment of the invention, reverse proxy server 102 includes one or more caches. In particular, the reverse proxy server may comprise a WebCache server from Oracle Corporation. Back-end servers 110, 112 may be configured, developed and/or operated by other entities, such as an organization that provides application services or web services to users. Thus, it may be noted that it is a back-end server, not the reverse proxy server, that logs users in and out, assigns session and/or user identifiers and generates/enforces other session attributes as necessary.

In such an embodiment, in which the reverse proxy server and the back-end servers are not part of an integrated system, the back-end servers may not be configured to share user session information with the reverse proxy server. And, the reverse proxy is generally configured to be transparent to users. However, as described above, the reverse proxy server is able to deduce or otherwise learn of the creation, expiration and tearing down of a user session (e.g., while it is intercepting or relaying communications between users and back-end servers). The reverse proxy may infer various user session activities from the pattern and/or content of communications between a user and a back-end server.

In another embodiment of the invention, user session meta-data managed by the user session management module includes security meta-data. The security meta-data may be used by the reverse proxy server to authenticate a user and/or authorize a user's access to cached data. Thus, instead of having to rely upon a back-end server to perform access control, or applying no access control at all, the reverse proxy can promote data security for data cached with the reverse proxy. The management and application of security meta-data at a reverse proxy cache is described in more detail in the following section.

Managing and Invalidating Security Meta-Data

Figure 2:
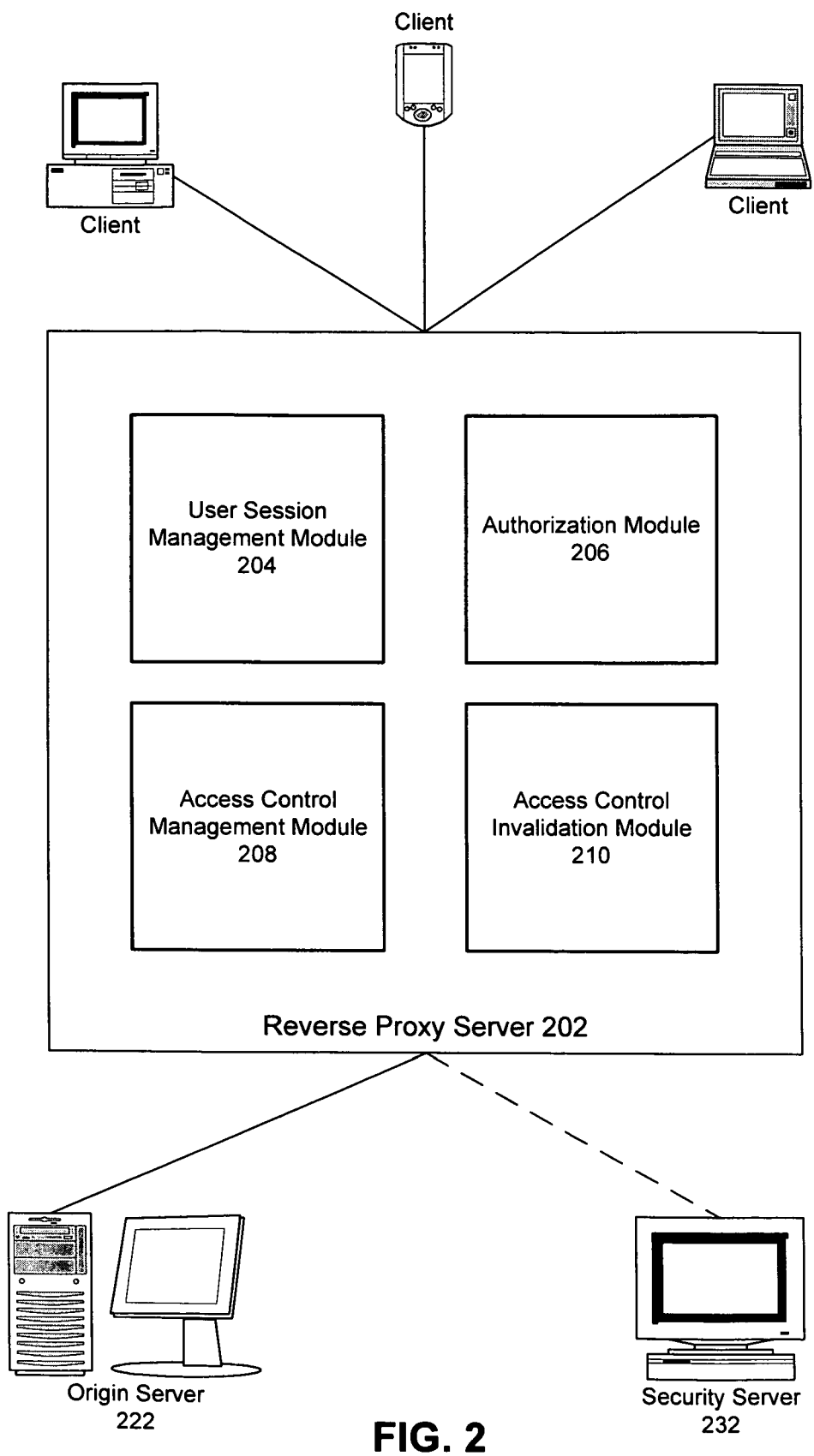
FIG. 2 is a block diagram illustrating a reverse proxy server configured to manage security meta-data, according to an embodiment of the invention.

FIG. 2 depicts a reverse proxy server configured to manage security meta-data relating to data cached in the reverse proxy, according to one embodiment of the invention.

In this embodiment, reverse proxy server 202 receives, stores and manages security meta-data from origin server 222 and/or security server 232. The reverse proxy server includes user session management module 204, authorization module 206, access control management module 208 and access control invalidation module 210.

User session management module 204 may operate similarly to user session management module 104 of FIG. 1. In particular, the user session management module tracks user session meta-data (e.g., user ID, session ID, session expiration), possibly with the user of a user session table.

Authorization module 206 receives users' requests for data and applies available access control information or other security meta-data. As described below, security meta-data applied by the authorization module may include Access Control Lists (ACLs), access control tokens, user privileges or roles, other user credentials, etc.

Access control management module 208 receives the security meta-data from origin server 222 and/or security server 232, for application by authorization module 206. The access control management module may also initiate requests for access control information or other security meta-data.

Access control invalidation module 210 receives and applies messages invalidating security meta-data, which may be originated by origin server 222 and/or security server 232. The access control invalidation module therefore helps ensure that obsolete access control information is not applied at the reverse proxy server.

In other embodiments of the invention, functions performed by the reverse proxy server may be divided among the same modules in a different way, or may be performed by different modules. For example, the functions of access control management module 208 and access control invalidation module 210 may be merged.

Origin server 222 may comprise an application server, a web server, a database or other entity configured to serve data in response to data requests. Origin server 222 applies some level of security to its operations. For example, the origin server may require users to login (e.g., with username and password) before receiving data, and may apply Access Control Lists (ACL) or other access control information or access control tokens to determine whether a particular user is authorized to receive a requested set of data.

Optional security server 232 represents an alternative, central, source of security meta-data for authorizing access to data served by origin server 222. Security meta-data provided by the security server (or origin server 222) to the reverse proxy may include an ACL, access control token or descriptor, username or user identifier, user session identifier, user alias(es), user privileges, user credentials, or any other form of access control information.

Illustratively, security server 232 is implemented if a central domain is to be employed for authorizing access to data. Otherwise, if origin server 222 is configured to manage security for its users' data accesses, then security server 232 may be omitted. In one embodiment of the invention, origin server 222 and security server 232 may be distinct from each other, but may be colocated on one computer system or collection of computer systems.

The reverse proxy server (e.g., access control invalidation module 210) may be configured to query a back-end server (e.g., origin server 222 and/or security server 232) for ACLs, user credentials or other access control information, or updates to security meta-data that has already been stored. For example, when the reverse proxy receives a data request, it may query a back-end server for access control information relating to the requested data (or updates to such information) unless, perhaps, it already has such information cached. The access control information received in response to its query may then be applied to determine whether the requestor can access the data (if the data are cached at the reverse proxy), or may be stored to facilitate access authorization for a subsequent request for the same data (if the data are retrieved from an origin server).

When access control information is changed at the origin server or the security server, a message may be sent to the reverse proxy to invalidate obsolete security meta-data. For example, when a user's group membership changes, or when a particular ACL or access control token no longer applies to a particular data object, the responsible back-end server (i.e., origin server 222 or security server 232) sends an invalidation message to the reverse proxy to invalidate the obsolete information.

In an embodiment of the invention, origin server 222 and security server 232 are enhanced with Application Programming Interface (API) modules configured to send access control information to a reverse proxy and, if necessary, receive and respond to a proxy's queries for such information.

In one embodiment of the invention, an ACL or other access control token or descriptor is treated as a monolithic entity, and may be identified by a URL (Uniform Resource Locator). An association between an ACL and a corresponding data object may be called an ACL Association. Both ACLs and ACL Associations may be retrieved by a reverse proxy, from an origin server or security server, via a query. In this embodiment, invalidation may be performed on the ACL Associations rather than the ACLs themselves, and an ACL without any linked ACL Associations may be deleted or garbage-collected. Separating ACLs from their Associations helps eliminate duplication of cached ACLs and promotes batch-mode invalidation of access control information. In a hierarchical arrangement, individual cached data objects may be grouped, with ACLs having ACL Associations with groups instead of individual objects.

Figure 3:
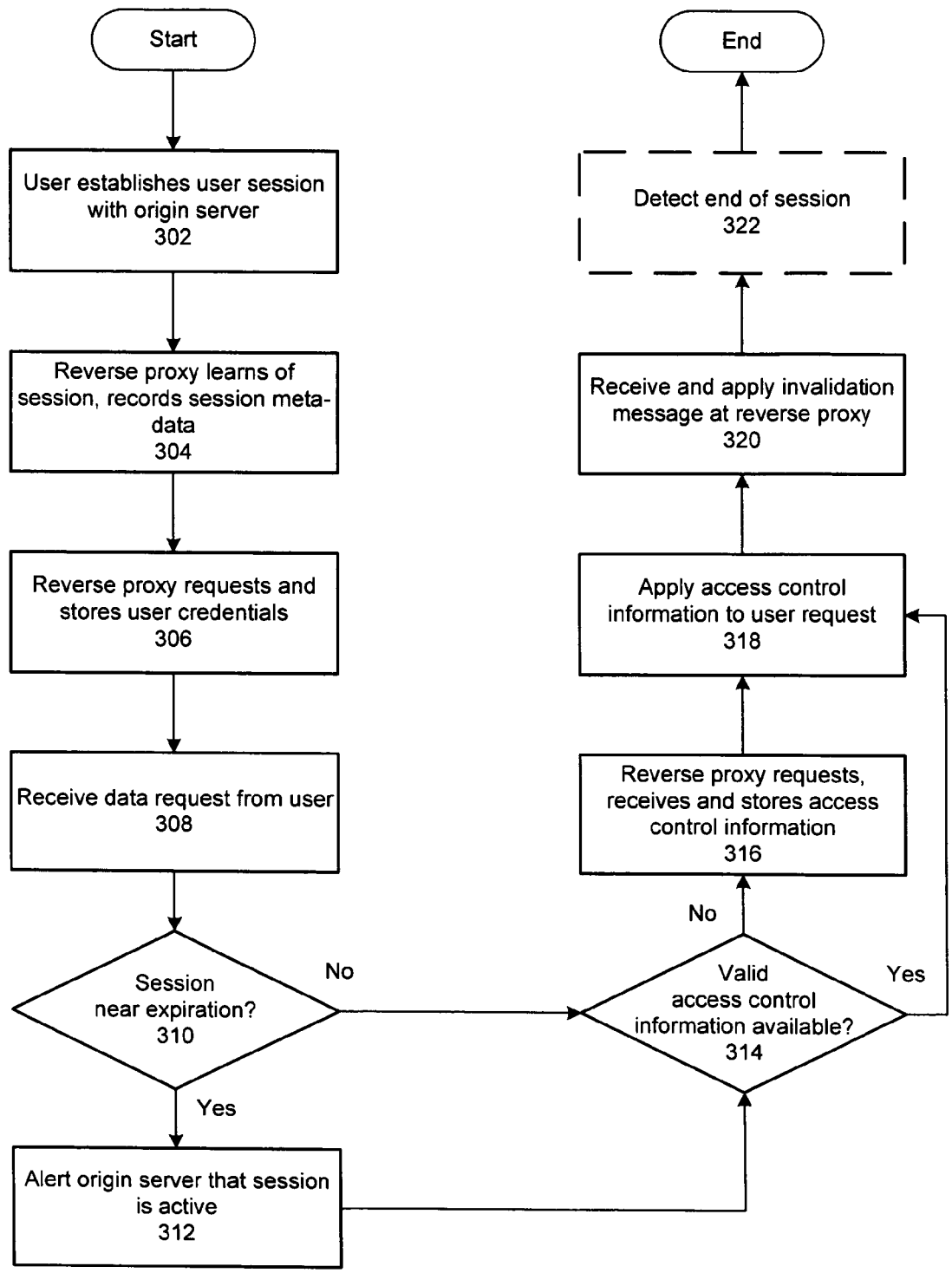
FIG. 3 is a flowchart illustrating one method of managing security meta-data in a reverse proxy, according to one embodiment of the invention.

FIG. 3 demonstrates a method of managing user session meta-data (including security meta-data) at a reverse proxy, according to one embodiment of the invention.

In operation 302, a user establishes a session with an origin server (e.g., an application server, web server, data server), which may require the user to authenticate himself/herself through a login process. As part of the login or session establishment, the user may provide a user identifier to the origin server, and the origin server may associate a session identifier with the new session.

In operation 304, a reverse proxy server learns of the new user session and obtains the user identifier and session identifier and stores them, along with any other relevant session meta-data (e.g., a session expiration, the user's browser type, user language). As described in the previous section, the reverse proxy may detect the session creation by monitoring the pattern or content of communications exchanged between the user and the origin server, may be informed of the session (and the associated session meta-data) by the origin server, or may obtain the session meta-data in some other way.

In operation 306, the reverse proxy server requests the user's security credentials from the origin server or a security server. In response, the reverse proxy may receive and store various information: the user's privileges, roles, aliases, ACLs or other access control information to be applied to the user's data requests, etc.

In operation 308, the reverse proxy receives a data request from the user. Alternatively, the reverse proxy may intercept a data request directed to the origin server.

In operation 310, the reverse proxy determines whether the user's session is near expiration. Because meta-data regarding the session is stored at the reverse proxy, it can readily determine whether an expiration date is approaching. If the session is near expiration, the illustrated method continues with operation 312; otherwise, the method advances to operation 314.

In operation 312, the reverse proxy notifies the origin server that this session is still active. The origin server may respond by extending the session's expiration date, by contacting the user or user's client to verify its status, or by taking other action.

In operation 314, the reverse proxy determines whether it possesses valid access control information for authorizing the user's access to the requested data. The proxy also determines whether it has a valid copy of the requested data. If the proxy does not already have a valid copy of the data, a request (e.g., the user's request) is forwarded to the origin server and the proxy receives and caches the data. If the data is received from the origin server, the origin server may also send to the proxy access control information for the data.

If the reverse proxy has a valid set of access control information for the data, the method advances to operation 318. Otherwise, the method continues with operation 316.

In operation 316, the reverse proxy requests and receives access control information for the requested data, from the origin server or a security server. The proxy may store the information for use with a later request for the same data.

In operation 318, the access control information is used to arbitrate the user's request (i.e., to authorize or deny the user's access to the requested data). If authorized, the data is served to the user. If the user is denied access, the reverse proxy may return a static rejection (e.g., a web page indicating access was denied). As one alternative, the proxy may forward the request to the origin server to allow it to take appropriate action.

In one embodiment of the invention, the reverse proxy routes a user's request to a specific origin server, such the least-loaded server or the server that maintains the server-side state of the user's session. This may be particularly useful in an environment in which all nodes of a cluster or all members of some other group of cooperating computer systems do not fully replicate or publish session state information among themselves.

In operation 320, the reverse proxy server receives an invalidation message regarding access control information for the same or a different set of data. In response, the reverse proxy invalidates the information.

In operation 322, after any number of requests has been processed for the user, the reverse proxy may learn of the end of the user's session. As described above, the reverse proxy may detect an explicit logout by the user, a session termination by the origin server, a session timeout, etc.

Although access control information is applied and stored at the reverse proxy server, in the embodiment of FIG. 3 access control information is not edited at the proxy (e.g., to change access authorization for a user or a data object). In addition, the reverse proxy applies access control information in a stateful manner. That is, it can correlate between a particular user or data requestor, and that requestor's session with an origin server. As one consequence, it need not receive a user's credentials with every data request sent from that user, as would be necessary in a stateless environment.

In addition, a reverse proxy can invalidate access control information it has stored (e.g., in response to an invalidation message from an origin server or a security server). Thus, there is little danger that the proxy will authorize or deny access on the basis of stale information.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable storage medium. Suitable computer-readable storage media may include volatile (e.g., RAM) and/or non-volatile (e.g., ROM, disk) memory.

What is claimed is:

1. A computer-implemented method of managing access control meta-data in a reverse proxy located between an origin server and one or more clients, the method at the reverse proxy comprising:
   receiving a data request from a user;
   receiving access control meta-data associated with the requested data;
   caching said access control meta-data;
   using said access control meta-data to arbitrate the data request;
   examining communication between the user and the origin server;
   extracting user session meta-data from the communication by monitoring the pattern or content of the communication between the user and the origin server, and using the pattern or content of the communication to detect the creation and tearing down of a user session as well as any associated expiration, wherein the user session meta data associates the user with a user session established for the user on the origin server; and
   maintaining the user session meta-data on the reverse proxy wherein the reverse proxy is configured to notify the origin server of any expiration of the user session established for the user on the origin server.

2. The method of claim 1, further comprising:
   receiving an invalidation message regarding said access control meta-data; and
   invalidating said access control meta-data in response to said invalidation message.

3. The method of claim 2, wherein the invalidation message is received from one of:
   the origin server; and
   a security server distinct from the origin server.

4. The method of claim 1, wherein said receiving access control meta-data comprises:
   forwarding the data request to the origin server;
   receiving the requested data from the origin server; and
   receiving said access control meta-data from the origin server.

5. The method of claim 1, further comprising, prior to said receiving access control meta-data:
   requesting said access control meta-data from the origin server.

6. The method of claim 1, further comprising, prior to said receiving access control meta-data:
requesting said access control meta-data from a security server.

7. The method of claim 1, wherein said user session meta-data comprises:
a user identifier; and
a session identifier.

8. The method of claim 7, wherein said user session meta-data further includes:
an expiration associated with the user session.

9. A computer readable storage medium storing instructions that, when executed by a computer, cause the computer to perform a method of managing access control meta-data in a reverse proxy located between an origin server and one or more clients, the method at the reverse proxy comprising:
receiving a data request from a user;
receiving access control meta-data associated with the requested data;
caching said access control meta-data;
using said access control meta-data to arbitrate the data request;
examining communication between the user and the origin server;
extracting user session meta-data from the communication by monitoring the pattern or content of the communication between the user and the origin server, and using the pattern or content of the communication to detect the creation and tearing down of a user session as well as any associated expiration, wherein the user session meta data associates the user with a user session established for the user on the origin server; and
maintain the user session meta-data on the reverse proxy, wherein the reverse proxy is configured to notify the origin server of any expiration of the user session established for the user on the origin server.

10. A computer-implemented method of applying access control information at a reverse proxy server acting as a proxy for a separate origin server, the method comprising:
caching a data object received from an origin server;
receiving access control information relating to the data object;
caching said access control information;
applying said access control information to arbitrate a user request for the data object;
examining communication between the user and the separate origin server;
extracting user session meta-data from the communication by monitoring the pattern or content of the communication between the user and the separate origin server, and using the pattern or content of the communication to detect the creation and tearing down of a user session as well as any associated expiration, wherein the user session meta data associates the user with a user session established for the user on the separate origin server; and
maintaining user session meta-data on the reverse proxy, wherein the reverse proxy is configured to notify the origin server of any expiration of the user session established for the user on the origin server.

11. The method of claim 10, further comprising:
receiving an invalidation message; and
invalidating said access control information in response to the invalidation message.

12. The method of claim 10, wherein said access control information is received from one of:
the origin server; and
a central security server.

13. The method of claim 10, wherein said access control information comprises:
a first access control token configured to identify a type of data access by a user; and
a first token association configured to associate said first access control token with the data object.

14. The method of claim 13, wherein said first access control token comprises an ACL (Access Control List).

15. The method of claim 13, further comprising:
invalidating said cached access control information by invalidating said first token association.

16. A computer readable storage medium storing instructions that, when executed by a computer, cause the computer to perform a method of applying access control information at a reverse proxy server acting as a proxy for a separate origin server, the method comprising:
caching a data object received from an origin server;
receiving access control information relating to the data object;
caching said access control information; and
applying said access control information to arbitrate a user request for the data object;
examining communication between the user and the separate origin server;
extracting user session meta-data from the communication by monitoring the pattern or content of the communication between the user and the separate origin server, and using the pattern or content of the communication to detect the creation and tearing down of a user session as well as any associated expiration, wherein the user session meta data associates the user with a user session established for the user on the separate origin server; and
maintaining user session meta-data on the reverse proxy, wherein the reverse proxy is configured to notify the origin server of any expiration of the user session established for the user on the origin server.

17. A computer-readable storage medium encoded with a data structure configured for storing access control meta-data associated with data cached in a reverse proxy cache, the data structure comprising:
one or more access control tokens configured to indicate a type of access by users to data objects cached in the reverse proxy cache;
a first association configured to associate a first access control token with a first data object cached in the reverse proxy cache; and
user session meta-data on the reverse proxy, wherein said user session meta-data is extracted from communication between the users and an origin server by monitoring the pattern or content of the communication, and using the pattern or content of the communication to detect the creation and tearing down of a user session as well as any associated expiration, wherein said user session meta-data associates the user with a user session established for the user on the origin server, and wherein the reverse proxy is configured to notify the origin server of any expiration of the user session established for the user on the origin server.

18. The computer-readable storage medium of claim 17, wherein the reverse proxy cache is operated as part of a reverse proxy server located between one or more users and an origin server configured to serve the data objects cached in the reverse proxy cache.

19. A computer-readable storage medium encoded with instructions for executing a reverse proxy server for caching security meta-data associated with data cached on the reverse proxy server, the instructions comprising:

an authorization module configured to apply said security meta-data to facilitate arbitration of a request from a user for a first data object cached on the reverse proxy server;

an access control management module configured to obtain said security meta-data; and an access control invalidation module configured to invalidate said security meta-data;

wherein said security meta-data comprises access control information for controlling access to the data cached on the reverse proxy server;

a traffic analyzer configured to examine communication between an origin server and the user; and a user session management module configured to:

extract user session meta-data from the communication by monitoring the pattern or content of the communication between the origin server and the user, including;

a first user identifier configured to identify the user; and a session identifier configured to identify the user session of the user on the origin server; and maintain the user session meta-data;

wherein said user session management module is further configured to use the pattern or content of the communication to detect the creation and tearing down of a user session as well as any associated expiration; and notify the origin server of any expiration of the user session of the first user on the origin server.

20. The computer-readable storage medium of claim 19, wherein said access control management module receives said security meta-data in response to a query issued to:

a security server.

21. The computer-readable storage medium of claim 19, wherein said access control management module automatically receives said security meta-data when the first data object is forwarded to the reverse proxy server by an origin server.

22. The computer-readable storage medium of claim 19, wherein said access control information comprises one or more of:

an ACL (Access Control List);

an access control token;

a user privilege; and a list of groups to which a user belongs.

23. The computer-readable storage medium of claim 19, wherein said access control invalidation module invalidates said security meta-data in response to an invalidation message received from one of:

a security server; and an origin server configured to serve the first data object.

* * * * *

UNITED STATES PATENT AND TRADEMARK OFFICE
CERTIFICATE OF CORRECTION

PATENT NO.        : 7,600,230 B2                                          Page 1 of 1
APPLICATION NO.   : 10/885338
DATED             : October 6, 2009
INVENTOR(S)       : Desai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Fifth Day of October, 2010

David J. Kappos
*Director of the United States Patent and Trademark Office*